J. A. ROBERTSON.
TIRE GAGE.
APPLICATION FILED MAY 22, 1913. RENEWED JULY 22, 1916.
1,218,119.
Patented Mar. 6, 1917.
2 SHEETS—SHEET 1.
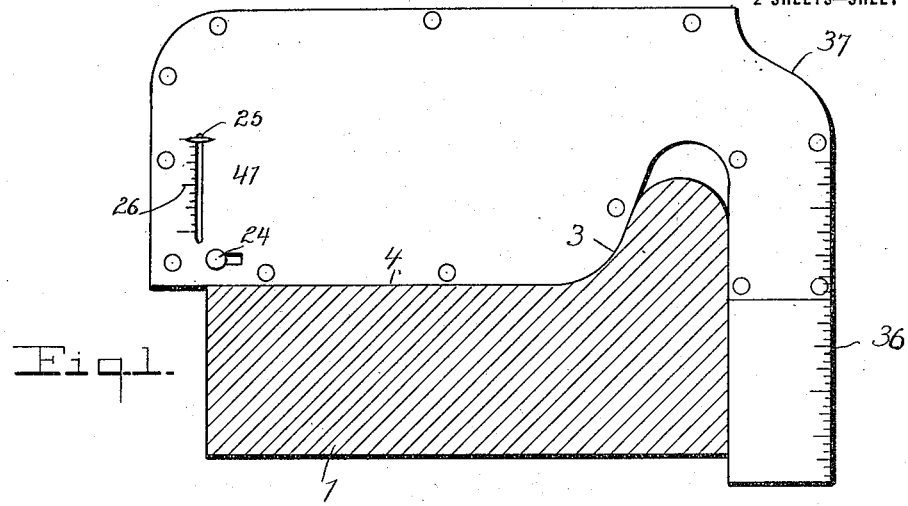
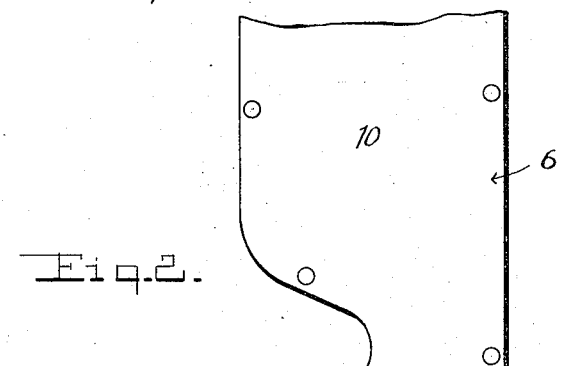
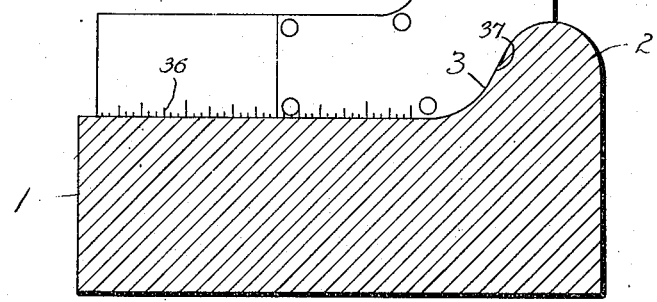
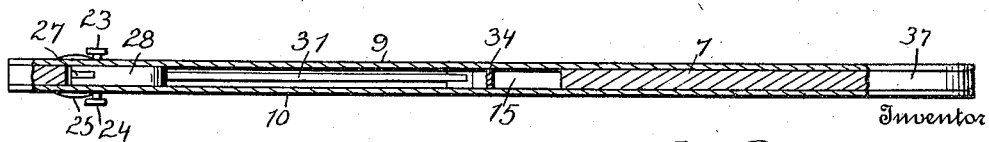
J. A. Robertson,
Inventor

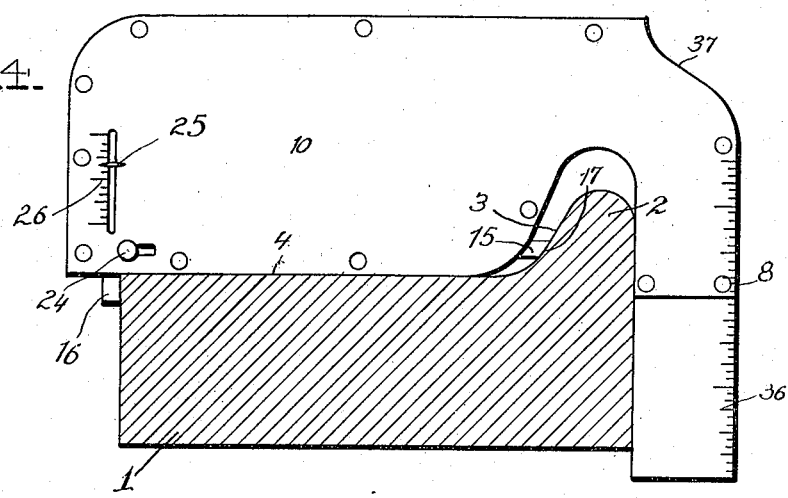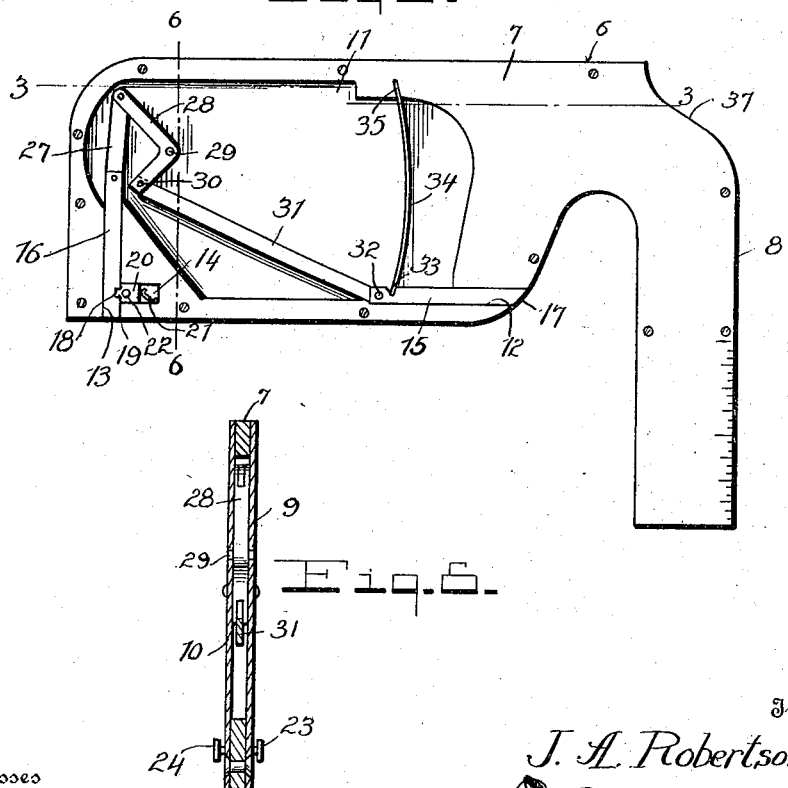

UNITED STATES PATENT OFFICE.

JOHN A. ROBERTSON, OF RICHMOND, VIRGINIA, ASSIGNOR OF ONE-HALF TO WIRT A. MARTIN, OF RICHMOND, VIRGINIA.

TIRE-GAGE.

1,218,119.        Specification of Letters Patent.      Patented Mar. 6, 1917.

Application filed May 22, 1913, Serial No. 769,264. Renewed July 22, 1916. Serial No. 110,803.

*To all whom it may concern:*

Be it known that I, JOHN A. ROBERTSON, a citizen of the United States, residing at Richmond, in the county of Henrico and State of Virginia, have invented certain new and useful Improvements in Tire-Gages; and I do hereby declare the following to be a full, clear, and exact description of the invention, such as will enable others skilled in the art to which it appertains to make and use the same.

This invention relates to new and useful improvements in tire gages for car wheels and has for its object to provide a device wherein the correct relation between the thickness of the tire and the flange formed on the edge thereof will be at all times insured, and whereby the amount of metal to be removed, as well as the actual depth to which the worn tire must be cut to restore the flange to its original shape may be determined.

Another object of my invention is to provide a device by means of which the flange is adapted to be shaped and trued up.

A still further object of my invention is to provide a device of the above character which may be used on all types of car wheels for the above and general inspection purposes.

With the above and other objects in view, I will now proceed to describe my invention in the following specification and accompanying drawings, in which—

Figure 1 is a sectional view of a car wheel tire showing my improved device applied thereto in position for measuring.

Fig. 2 is a view similar to Fig. 1 with the tire gage in position for testing the finished flange.

Fig. 3 is a horizontal sectional view on line 3—3 of Fig. 5.

Fig. 4 is a view similar to Fig. 1 as the device would appear when applied to a tire which has been worn.

Fig. 5 is a detail view of the gage with the outer plate removed; and

Fig. 6 is a longitudinal sectional view taken on line 6—6 of Fig. 5.

Referring to the drawings by characters of reference, 1 indicates the tire of a wheel having at one side thereof, the usual flange 2. This flange 2 is provided with the usual throat 3 at which point it joins the surface 4 of the tire.

A gage 6, comprising the main body portion of the frame 7 having at one extremity thereof an integral arm 8, extending at right angles thereto, is provided with the side plates 9 and 10, which are adapted to be riveted or otherwise attached to the main frame and conceal the inner mechanism of the gage. The inner mechanism, which will be hereinafter more fully described, is contained within an enlarged recess 11 which is formed intermediate the arm 8 and the opposite end of the frame 7. This recess is closed at its lateral extremities by means of the plates 9 and 10 which are secured to the frame as previously described. Openings 12 and 13 are provided in the frame and adapted to communicate with the inner recess, the use of which will be hereinafter more fully described. A slot 14 extends longitudinally of the frame said slot being adjacent the end opposite the arm 8 and communicating with the opening 13.

The openings 12 and 13 extend at right angles to each other and are adapted to receive pins 15 and 16, respectively. The end of the pin 15 is curved as shown at 17, to take the contour of the throat of the car wheel flange, against which it is adapted to lie when the device is in operation. Adjacent the lower end of the pin 16 I preferably provide a notch 18 which is adapted to be engaged by a lug 19 formed on a latch 20 which is seated in the recess 14 and is adapted to be pressed outwardly by means of the leaf spring 21. This latch is provided with an aperture through which a rivet 22 is adapted to extend, this rivet is provided at its outer extremities with heads 23 and 24 which are adapted to form thumb pieces whereby the pins 15 and 16 may be released. The pin 16 is provided adjacent its opposite end with the indicator points 25 which are adapted to slide along the graduated portions 26 of the plates 9 and 10, and indicate at which point the tire is to be cut. A link 27 is pivoted to the end of the pin 16 and is pivotally connected at its opposite end with a bell crank 28 which is pivoted as shown at 29 to the sides 9 and 10 of the gage. The opposite arm of the bell crank extends at right angles to the arm 28 and is pivoted as shown at 30 to a link 31, the opposite end of which is in turn pivoted to the inner end of the pin 15, as indicated at 32. Adjacent the pivot 32 I preferably provide a notch 33 in which the end of a spring 34 is adapted to seat, the opposite end of the spring 34 being rigidly fixed in the frame of the gage, as clearly illustrated at 35.

The outer extremity of the arm 8 is extended and provided with graduations 36 by means of which the width of the tire is adapted to be measured, or any other measurement may be made. At the point where the arm 8 joins the main body portion of the gage I preferably provide a curve 37 which is formed to take the contour of the flange of the car wheel thereby permitting the width of the tire to be measured without necessitating a special tool for this particular work, and the contour of the flange to be tested for wear or inaccuracy.

It will be seen from the foregoing that when my improved gage is applied to a tire of a locomotive or car, should the said tire be worn, the pin 15 will slide outwardly, as clearly illustrated in Fig. 4, so that the surface 17 comes in contact with the throat of the flange. Upon the sliding of the pin 15 outwardly the pin 16 slides downwardly and indicates the point at which the tire is to be cut to form a perfect flange thereon. When my device is applied, as illustrated in Fig. 2, it will be clearly seen that the width of the tire may be easily determined, the contour of the flange may be tested, and the defects noted.

When roughing out wheels in a lathe a stopping point for the roughing cut may be obtained, by having the pins 15 and 16 locked in their inner-most position by the latch 20, the lug 19 of which enters the notch 18 in the pin 16 and holds the same against movement. The gage is then placed in position on the tire as shown in Fig. 1.

While in the foregoing, I have shown and described the preferred embodiment of my invention, it is to be understood that I may change the specific structure and arrangement of parts, without departing from the spirit and scope of the appended claims.

What I claim is:

1. In a device of the character described, a hollow main body portion, an arm extending at right angles from said body portion and forming a stop therefor, the body being formed with a recess adjacent the arm, the said recess being adapted to receive the flange of a car wheel, slidable pins mounted within the body portion, one of said pins extending parallel with the arm, the other of said pins extending adjacently to the arm and parallel to the body portion and means operably connecting the pins.

2. A device of the character described comprising a frame, plates secured to the sides of the frame, the frame having a recess near one end, an arm extending at right angles to the frame, and integral with the recessed end thereof, pins slidable within the frame, links connected to the pins, a bell crank operatively mounted between the plates, the arms of the bell crank connected to the links, and an indicator carried by one of said pins, there being graduations on the sides of the plates coöperating with the indicator.

3. In a device of the character described, a frame, an arm extending at right angles thereto and formed integral with one end thereof, said arm forming a stop to limit the movement of the frame, pins extending at right angles to each other, a bell crank pivotally mounted within the frame, and links connecting the arms of the bell crank respectively with the pins, whereby upon reciprocation of one of the pins the other of the pins will move proportionately to the first-mentioned pin.

4. In a tire gage, a frame, an arm formed at one end of the frame and integral therewith, the frame being provided with a flange-receiving recess near the arm, said frame also being provided with a second recess, plates secured to the frame to close the second recess, pins slidable in said second recess in the frame, resilient means to force the pins outwardly, a bell crank pivoted in the second recess, links connecting the arms of the bell crank with the pins, and means to lock the pins in their innermost position.

5. A tire gage comprising a hollow frame having a flange-receiving recess therein, an arm extending at right angles to the frame, said frame being provided with a groove adjacent to the arm and also having a groove near its opposite end, a pin slidable in the first-mentioned groove, a bell crank pivoted in the frame, a notched pin slidable in the second-mentioned groove, each of the pins being connected to the bell crank, side plates secured to the frame and adapted to support the bell crank, resilient means to force the pins outwardly, a latch slidable in the frame, and a lug on the latch adapted to engage in the notch in the second-mentioned pin to hold said pins in their innermost position.

In testimony whereof I affix my signature in presence of two witnesses.

JOHN A. ROBERTSON.

Witnesses:
ALFRED L. BLAKE,
A. REED.

Copies of this patent may be obtained for five cents each, by addressing the "Commissioner of Patents, Washington, D. C."